Patented Apr. 12, 1927.

1,624,089

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

INSECT LIME AND METHOD OF MAKING THE SAME.

No Drawing.     Application filed June 24, 1926. Serial No. 118,365.

My invention relates to an insect lime comprising rubber or synthetic rubber in aqueous dispersion, or rubber latex, and a non-drying oil, and methods of making the same.

Among the objects of my invention is to provide an insect lime which will not, in use, become hardened or dried out and thereby lose or diminish its efficiency, and which may be applied as a coating or surfacing to paper or flexible sheetings or to trees, shrubs or other forms of plant life, preferably as a girdle, and by reason of its adhesive properties serve to catch and hold insects, worms, rodents or other obnoxious or parasitic beings.

An aqueous dispersion of rubber is readily emulsifiable with a non-drying oil, such a mixture being relatively stable and retaining its adhesive properties for a long period.

As an example of my insect lime suitable to be applied to a tree or shrub, preferably in the form of a girdle about the trunk, I give the following:

| | Parts by weight. |
|---|---|
| Rubber latex (approximately 35% rubber content) | 1 |
| Petroleum oil | 2 |

The latex is thoroughly mixed with the oil and then the water is preferably removed by evaporation or centrifuging. To insure against coagulation, as may sometimes be desirable, a stabilizing medium may be used by either, for example, subjecting the latex or the oil to the action of an alkali or adding a supporting aqueous or hydrophilic, that is to say, water absorptive, colloid such as bentonite clay or a glue to either the latex or oil before combining them.

A suitable coating for application to paper or other flexible sheeting may be made as follows:

| | Parts by weight. |
|---|---|
| Rubber latex (approximately 35% rubber content) | 1 |
| Molasses | 2 |
| Lard oil | 2 |

The molasses serves both as a sweetening agent to attract the insects, etc., and also as a hydrophilic colloid. The latex and molasses are preferably first thoroughly mixed therewith. The water present is then removed by evaporation or other suitable method. The composition may be applied to the backing in any suitable manner.

When for various reasons it may be desirable not to use rubber latex, the rubber or synthetic rubber, crude, refined or reclaimed, may be aqueously dispersed, thus forming an artificial dispersion of rubber, in combination with a non-drying oil, for example, animal, vegetable, mineral or marine non-drying oils, fats, fatty acids or waxes. When waxes are used they may be first dissolved in volatile solvents therefor, such as gasoline or benzol.

The non-oxidizing or non-drying oils, waxes or fatty substances may be used in their natural states or in their chlorinated, sulphonated or like states.

While I have herein described some particular compositions embodying my invention and methods of producing the same, it is to be understood that the invention is not limited to the precise methods, ingredients or properties mentioned.

Having thus described my invention, I claim and desire to protect by Letters Patent of the United States:

1. An insect lime comprising rubber dispersed in an aqueous medium, and a non-drying oil.
2. An insect lime comprising rubber dispersed in an aqueous medium, a sweetening agent, and a non-drying oil.
3. An insect lime comprising rubber latex, a hydrophilic colloid, and a non-drying oil.
4. An insect lime comprising one part of rubber latex and two parts of a non-oxidizing oil.
5. The method of producing an insect lime consisting of commingling aqueously dispersed rubber in a hydrophilic colloid and then adding a non-drying oil thereto.
6. The method of producing an insect lime consisting of combining rubber in aqueous dispersion with a non-drying oil.
7. The method of producing an insect lime consisting of putting rubber in aqueous dispersion, mixing a non-drying oil therewith and then evaporating the water.

In witness whereof I have hereunto set my hand this 23d day of June, 1926.

ARTHUR BIDDLE.